Figure 1:
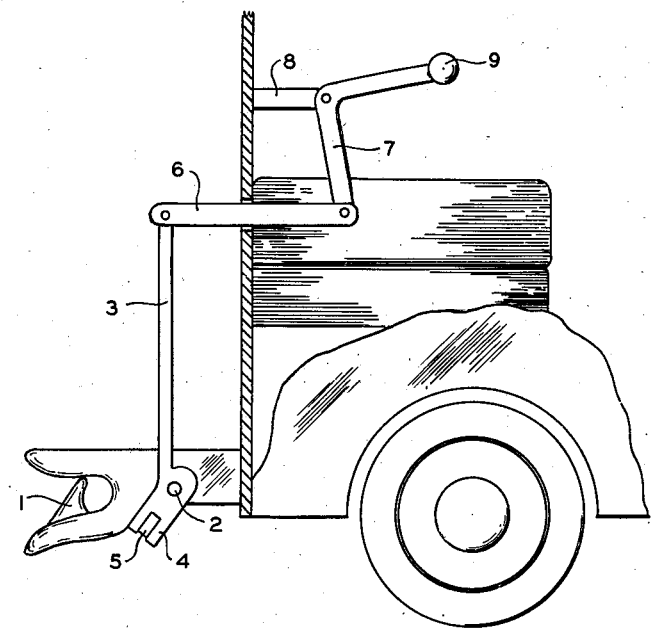

Sept. 27, 1949.    L. C. CARMICHAEL    2,482,741
SAFETY COUPLING

Filed May 3, 1946

INVENTOR.
LESLIE C. CARMICHAEL

BY Harry M. Saragovitz

ATTORNEY

Patented Sept. 27, 1949

2,482,741

UNITED STATES PATENT OFFICE 2,482,741

SAFETY COUPLING

Leslie C. Carmichael, Lexington, Ky.

Application May 3, 1946, Serial No. 666,932

1 Claim. (Cl. 280—33.15)

(Granted under the act of March 3, 1883, as amended April 30, 1928; 370 O. G. 757)

The invention described herein may be manufactured and used by or for the Government for governmental purposes, without the payment to me of any royalty thereon.

The invention to be hereinafter described relates to safety couplings for connecting a warehouse truck and its dolly.

In large factories, industrial plants, warehouses, storage of various types and all other fields in which large stocks of goods are handled, as well as in many other uses, small warehouse tractors are in wide use for hauling one or more wheeled platforms, dollies, or the like with their respective loads. Such tractors are provided with one part of a coupling designed to cooperate with a corresponding coupling member or part on the dolly. The part on the tractor includes a pivoted hook so shaped that, once in operative position, it will remain so until positively disengaged, the pull of the load acting to further assure maintained coupling, all as will be well understood. Also, as is well known, these hooks gravitate to closed or engaging position except when positively actuated to open or releasing position. The most widely used construction and arrangement for opening the hook to effect coupling has been a chain connected to the hook and brought up the back of the tractor behind and slightly to one side of the operator's seat. For each coupling, the driver has to feel back behind him for that chain while endeavoring to watch in all directions, especially forward and back, while coupling to the dolly in the rear of his car. The result has been innumerable accidents and many injuries, some very serious. In addition to the matter of accidents there is bound to be considerable delay in getting hold of the chain which is out of sight.

The main objects of the present invention are to completely eliminate or greatly minimize the above and other objections and provide a simple, compact, efficient, durable and low cost device which may be extended close beside the operator where the operator's hand will normally automatically contact it and where it will be ready for instant operation at all times.

In order to more clearly disclose the construction, operation and use of the invention, reference should be had to the accompanying drawings forming part of the present application. Throughout the several figures of the drawings like reference characters designate the same parts in the different views.

Figure 2:
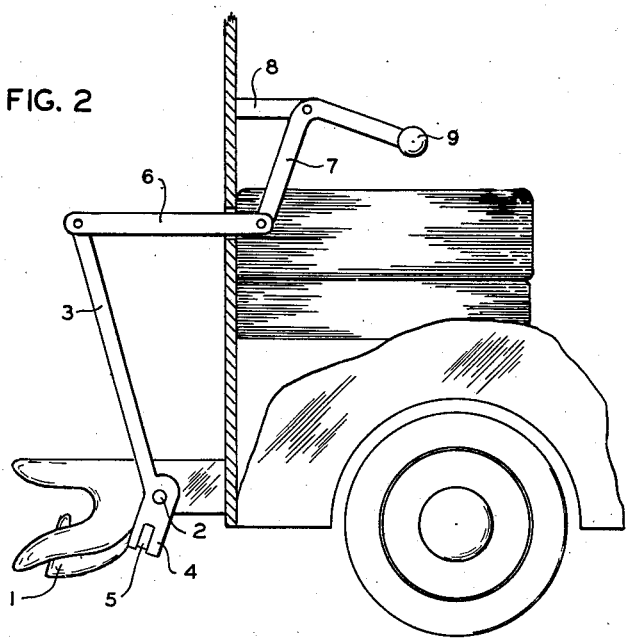

In the drawings:

Fig. 1 is a side elevation of the invention in coupled, operative or closed position; and Fig. 2 is a like view in uncoupled, inoperative or opened position.

For simplicity in illustration, the invention has been shown as applied to a tractor on which the driver sits slightly to one side of the longitudinal center or line of coupling or draft.

In the preferred form, illustrated in the drawings of this application, a single bell-crank or elbow lever is connected by a short rearwardly extending link to the upper end of a relatively long vertical lever extending down the back of the tractor to the coupling head where it is fulcrumed, the short lower end of that lever being connected to the pivoted movable hook member of the tractor coupling. The fulcrum of the bell-crank lever is placed close beside the driver's seat and either on the rear wall of the tractor or on the seat level at one side of the driver, with the handle end positioned beside the operator's seat where the driver's hand would logically normally and easily fall. The weight of the coupling hook link, vertical lever and coupling hook normally maintain the hook open or inoperative as shown in Fig. 2. When the bell-crank handle is raised up, the vertical lever will be swung to close the coupling hook, as in Fig. 1. As soon as coupling is effected and load imposed, the hook will be maintained operative by pull of the load, as is well understood. Needless to state, springs may be used to assist movement of the lever and link mechanism in either direction or to maintain either operative or inoperative position of the coupling hook.

Referring to the drawings in detail, 1 indicates the pivoted coupling hook of usual and well known construction. Fulcrumed about the pivot 2 is a vertical lever 3, extending from the hook mounting to the seat level, approximately of the tractor and directly above the draft line. The short arm of lever 3, projecting below the fulcrum 2 is forked as at 4 to slidingly receive a lug 5 fixed to and projecting laterally from 1. To the upper end of 3 is pivotally connected one end of a link 6, the opposite end of which is connected to a bell-crank or elbow lever 7 fulcrumed in a suitable support 8 extending forwardly from the rear wall of the tractor and placing the handle or hand grip 9 of the bell-crank close beside the tractor driver.

By depressing 9 the coupling hook will be opened.

The construction hereinabove described is the simplest form. Many variations and rearrangements may be had incorporating the substance of that described. For instance, the fulcrum post 8 instead of being mounted on the rear wall of the tractor could be mounted on the seat or on the tractor adjacent the seat. Also, in tractors in which the driver sits at the center and directly over the line of draft, the bell-crank 7 may be made in the form of a right angle, the handle portion being parallel with the line of draft but considerably to one side thereof with the fulcrum correspondingly to one side of that line of draft. In that case, the other branch of lever 7 after passing through the back wall of the tractor extends behind the driver's seat to a point directly above the line of draft where it is pivoted to the upper end of the lever 3. An alternative arrangement to that above would be to have a short countershaft, at right angles to the line of draft with an arm at each end, one arm connected to the rear end of the lever shown in this application and the other connected to the upper end of the lever 7.

In operation, the driver backs his tractor up to the dolly and as it comes into position simply depresses hand grip 9, thereby opening the coupling hook 1 to the position of Fig. 2, continues backing to final position for coupling and then raises the lever. The hook 1 then instantly moves into coupled position for the reason aforesaid, and the connection is completed.

Many changes may be made in the construction, arrangement and disposition of the several parts of the invention within the scope of the appended claims without departing from the field of the invention, and it is meant to include all such within this application wherein only one preferred form has been illustrated purely by way of example and with no thought or intent to, in any degree, limit the application thereby.

Having thus described my invention, what I claim and desire to protect by Letters Patent is:

A coupling device comprising a coupling head having spaced upper and lower members, a pivotedly mounted hook normally in a downward uncoupled position, a laterally extending lug on said hook, means for raising and lowering said hook into coupled and uncoupled positions, said means comprising a pivoted lever having a slot engageable with said lug, and a bell crank lever operably connected to said pivoted lever, whereby, upon operable movements of the bell crank lever, the pivoted lever and the hook pivot in the same rotational direction.

LESLIE C. CARMICHAEL.

REFERENCES CITED

The following references are of record in the file of this patent:

UNITED STATES PATENTS

| Number | Name | Date |
|--------|------|------|
| 752,731 | Wallace | Feb. 23, 1904 |
| 1,337,391 | Cooper | Apr. 20, 1920 |